United States Patent
Huang et al.

(10) Patent No.: US 8,995,431 B2
(45) Date of Patent: Mar. 31, 2015

(54) COMMUNICATION METHOD AND SYSTEM THEREOF

(71) Applicants: Nen-Fu Huang, Hsinchu (TW);
Wei-Kuan Shih, Hsinchu (TW)

(72) Inventors: Nen-Fu Huang, Hsinchu (TW);
Wei-Kuan Shih, Hsinchu (TW)

( * ) Notice: Subject to any disclaimer, the term of this patent is extended or adjusted under 35 U.S.C. 154(b) by 164 days.

(21) Appl. No.: 13/925,902

(22) Filed: Jun. 25, 2013

(65) Prior Publication Data

US 2014/0064266 A1 Mar. 6, 2014

(30) Foreign Application Priority Data

Sep. 6, 2012 (TW) .............................. 101132613 A

(51) Int. Cl.
*H04L 12/66* (2006.01)
*H04L 12/931* (2013.01)
*H04M 3/42* (2006.01)
*H04M 7/12* (2006.01)

(52) U.S. Cl.
CPC ......... *H04L 49/602* (2013.01); *H04M 3/42314* (2013.01); *H04M 7/1205* (2013.01)
USPC ........................................................ 370/352

(58) Field of Classification Search
None
See application file for complete search history.

(56) References Cited

U.S. PATENT DOCUMENTS

| | | | |
|---|---|---|---|
| 5,608,786 A * | 3/1997 | Gordon ......................... | 370/352 |
| 5,910,946 A * | 6/1999 | Csapo ........................... | 370/328 |
| 6,069,890 A * | 5/2000 | White et al. .................. | 370/352 |
| 6,222,859 B1 * | 4/2001 | Yoshikawa .................... | 370/522 |
| 6,243,373 B1 * | 6/2001 | Turock .......................... | 370/352 |
| 6,353,610 B1 * | 3/2002 | Bhattacharya et al. ....... | 370/352 |
| 6,363,065 B1 * | 3/2002 | Thornton et al. ............. | 370/352 |
| 6,574,216 B1 * | 6/2003 | Farris et al. .................. | 370/352 |
| 7,415,004 B2 * | 8/2008 | Yeom et al. ................... | 370/352 |

* cited by examiner

*Primary Examiner* — Frank Duong
(74) *Attorney, Agent, or Firm* — Hudak, Shunk & Farine Co. LPA

(57) ABSTRACT

Disclosed are a communication method and a communication system. The method includes the following steps: a first communication device sends a communication request signal and a second identification code corresponding to a second communication device to a first switch device via a first exchange device by means of telephone connection; the first switch device sends the communication request signal and the second identification code to a second switch device via a cloud server by means of network connection; the second switch device sends the communication request signal to the second communication device via a second exchange device by means of telephone connection; when the second communication device confirms the communication request signal, a communication connection is set up between the first communication device and the second communication device via the first switch device, the cloud server and the second switch device.

16 Claims, 4 Drawing Sheets

COMMUNICATION METHOD AND SYSTEM THEREOF

CROSS-REFERENCE TO RELATED APPLICATION

This application claims the benefit of Taiwan Application No. 101132613, filed on Sep. 6, 2012, in the Taiwan Intellectual Property Office, the disclosure of which is incorporated herein in its entirety by reference.

BACKGROUND OF THE INVENTION

1. Field of the Invention

The present invention relates to a communication method and a system thereof, and more particularly to a communication method and a system thereof which establishes connection via internet through a switch device that connects telephone line and internet line and a cloud server.

2. Description of the Related Art

As our society becomes commercialized, office extension system has become an indispensible communication system in offices. However, the telephone fee of the office extension system is charged by the telephone connection time, so that when telephone calls are made in different communication domains for a long time, a substantial cost of the telephone fee is incurred to companies. Therefore, it has always been an important issue for companies to save the telephone fee of the office extension system.

At present, most methods of saving the telephone fee of the office extension system are to change the private branch exchange (PBX) of the office extension system to the internet protocol private branch exchange (IP PBX) and upgrade the office extension system to a network extension system, so that the telephone calls made within the system may be connected via network connection, and the telephone fee charged by the network connection is much cheaper than the telephone fee charged by the telephone connection. The present invention may save the telephone cost significantly.

However, the construction cost of the network extension system at the beginning is very expensive, and companies are reluctant to build the network extension system and keep using the conventional office extension system charged according to the telephone fee. Most companies save the telephone cost in a passive manner by limiting the time of their telephone calls. Obviously, this way of saving costs of the office extension system has tremendous limitations and becomes a major problem for related manufacturers and designers to overcome.

In view of the aforementioned drawbacks, the inventor of the present invention based on years of experience in the related industry to conduct extensive researches and experiments, and finally designed and developed a communication method and a system thereof to overcome the drawbacks of the prior art and improve industrial applications.

SUMMARY OF THE INVENTION

In view of the aforementioned problem of the prior art, it is a primary objective of the present invention to provide a communication method and a system thereof to overcome the problem of the conventional communication system which cannot save the telephone fee effectively.

To achieve the aforementioned objective, the present invention provides a communication method and a system thereof, and the communication method comprises steps of: sending a communication request signal and a second identification code corresponding to a second communication device by a first communication device; receiving the communication request signal and the second identification code and sending the communication request signal and the second identification code to a first switch device by a first exchange device; receiving the communication request signal and the second identification code, and sending the communication request signal and the second identification code to a cloud server via network transmission by the first switch device; sending the communication request signal and the second identification code to a second switch device according to the communication request signal and the second identification code by the cloud server; receiving the communication request signal and the second identification code, and then sending the communication request signal and the second identification code to a second exchange device by the second switch device; sending the communication request signal to the second communication device according to the communication request signal and the second identification code by the second exchange device; and receiving the communication request signal by the second communication device, and then establishing a network communication connection with the first communication device through the first switch device, the cloud server and the second switch device.

Preferably, the communication method of the present invention further comprises steps of: determining whether the second communication device falls within the same communication domain of the first exchange device according to the second identification code by the first exchange device; if so, then transmitting the communication request signal to the second communication device, and receiving the communication request signal by the second communication device, and then establishing a telephone communication connection with the first communication device through the first exchange device; or else transmitting the communication request signal and the second identification code to the first switch device.

Preferably, the first switch device has a first registration code, and the second switch device has a second registration code, and the communication method of the present invention further comprises a step of: recording the first registration code corresponding to the first identification code of the first communication device and the second registration code corresponding to the second identification code by the cloud server to determine establishing a network connection with the first switch device or the second switch device.

Preferably, the communication method of the present invention further comprises steps of: receiving the second identification code and then comparing the second identification code with the recorded second registration code corresponding to the second identification code by the cloud server; and transmitting the communication request signal and the second identification code to the second switch device according to the second registration code by the cloud server.

Preferably, the first exchange device and the second exchange device are connected to at least one third communication device via telephone connection.

Preferably, the first switch device and the second switch device are connected to at least one fourth communication device via network connection.

Preferably, the communication method of the present invention further comprises steps of: sending the first identification code, the communication request signal and the second identification code to the cloud serve by a network communication device; receiving the first identification code, the communication request signal and the second identification code and sending the communication request signal and the first identification code to the first switch device according to the first identification code and the second identification code, and sending the communication request signal and the second identification code to the second switch device by the cloud server; receiving the communication request signal and the first identification code, and then sending the communication request signal and the first identification code to the first exchange device by the first switch device, and receiving the communication request signal and the second identification code and then sending the communication request signal and the second identification code to the second exchange device by the second switch device; sending the communication request signal to the first communication device according to the communication request signal and the first identification code by the first exchange device, and sending the communication request signal to the second communication device according to the communication request signal and the second identification code by the second exchange device; receiving the communication request signal by the first communication device and the second communication device, and then establishing network communication connection through the first switch device, the cloud server and the second switch device.

Preferably, the communication method of the present invention, in which the second switch device records a switch code corresponding to the second communication device, further comprises a step of: when the second communication device has not received the communication request signal after a predetermined time, transferring the communication request signal to a communication device corresponding to the switch code according to the switch code by the second switch device.

To achieve the aforementioned objective, the present invention further provides a communication system, comprising: a first communication device sending a communication request signal and a second identification code corresponding to a second communication device; a first exchange device receiving the communication request signal and the second identification code and sending the communication request signal and the second identification code to a first switch device; the first switch device receiving the communication request signal and the second identification code and sending the communication request signal and the second identification code to a cloud server via network transmission; the cloud server sending the communication request signal and the second identification code to a second switch device according to the communication request signal and the second identification code; the second switch device receiving the communication request signal and the second identification code, and sending the communication request signal and the second identification code to a second exchange device; the second exchange device sending the communication request signal to the second communication device according to the communication request signal and the second identification code; and the second communication device receiving the communication request signal and establishing a network communication connection with the first communication device through the first switch device, the cloud server and the second switch device.

In summation, the communication method and system of the present invention have one or more of the following advantages:

(1) The communication method and system of the present invention utilize a switch device to establish communication connection via network to save the telephone fee effectively.

(2) The communication method and system of the present invention may achieve the same purpose of the internet protocol private branch exchange (IP PBX) in a network extension system by adding a switch device on the conventional private branch exchange (PBX) in an office extension system without replacing the whole system, thus reduce the construction cost for a network extension system significantly.

(3) The communication method and system of the present invention may achieve the purpose of expanding extensions easily by connecting a plurality of Internet phones through a switch device.

DESCRIPTION OF THE PREFERRED EMBODIMENTS

The technical characteristics, contents, advantages and effects of the present invention will become apparent from the following detailed description taken with the accompanying drawing.

Figure 1:
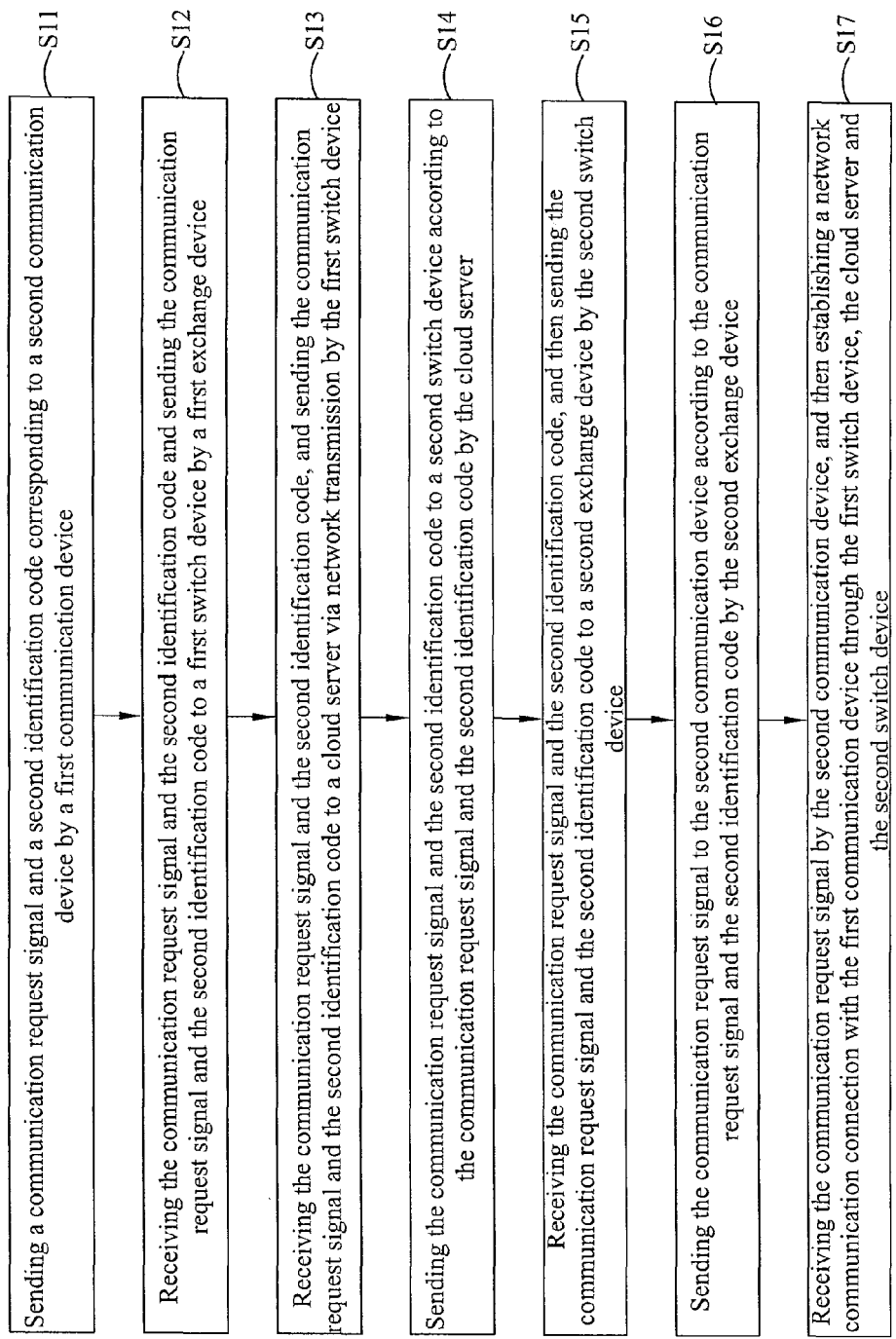
FIG. 1 is a flow chart of a communication method of the present invention.

With reference to FIG. 1 for a flow chart of a communication method of the present invention, the communication method comprises the following steps:

S11: Sending a communication request signal and a second identification code corresponding to a second communication device by a first communication device.

S12: Receiving the communication request signal and the second identification code and sending the communication request signal and the second identification code to a first switch device by a first exchange device.

S13: Receiving the communication request signal and the second identification code, and sending the communication request signal and the second identification code to a cloud server via network transmission by the first switch device.

S14: Sending the communication request signal and the second identification code to a second switch device according to the communication request signal and the second identification code by the cloud server.

S15: Receiving the communication request signal and the second identification code, and then sending the communication request signal and the second identification code to a second exchange device by the second switch device.

S16: Sending the communication request signal to the second communication device according to the communication request signal and the second identification code by the second exchange device.

S17: Receiving the communication request signal by the second communication device, and then establishing a network communication connection with the first communication device through the first switch device, the cloud server and the second switch device.

It is noteworthy to point out that the first exchange device and second exchange device as described above may preferably be private branch exchange (PBX).

The main objective of the present invention is to connect a conventional exchange device for establishing a telephone connection to an end of a switch device, so that the other end of the switch device may be connected via network to achieve the purpose of making and receiving calls via network connection. In other words, users may use traditional extension lines for making and receiving telephone calls, and the calls are charged according to the network connection, thus the telephone cost may be reduced significantly.

Figure 2:
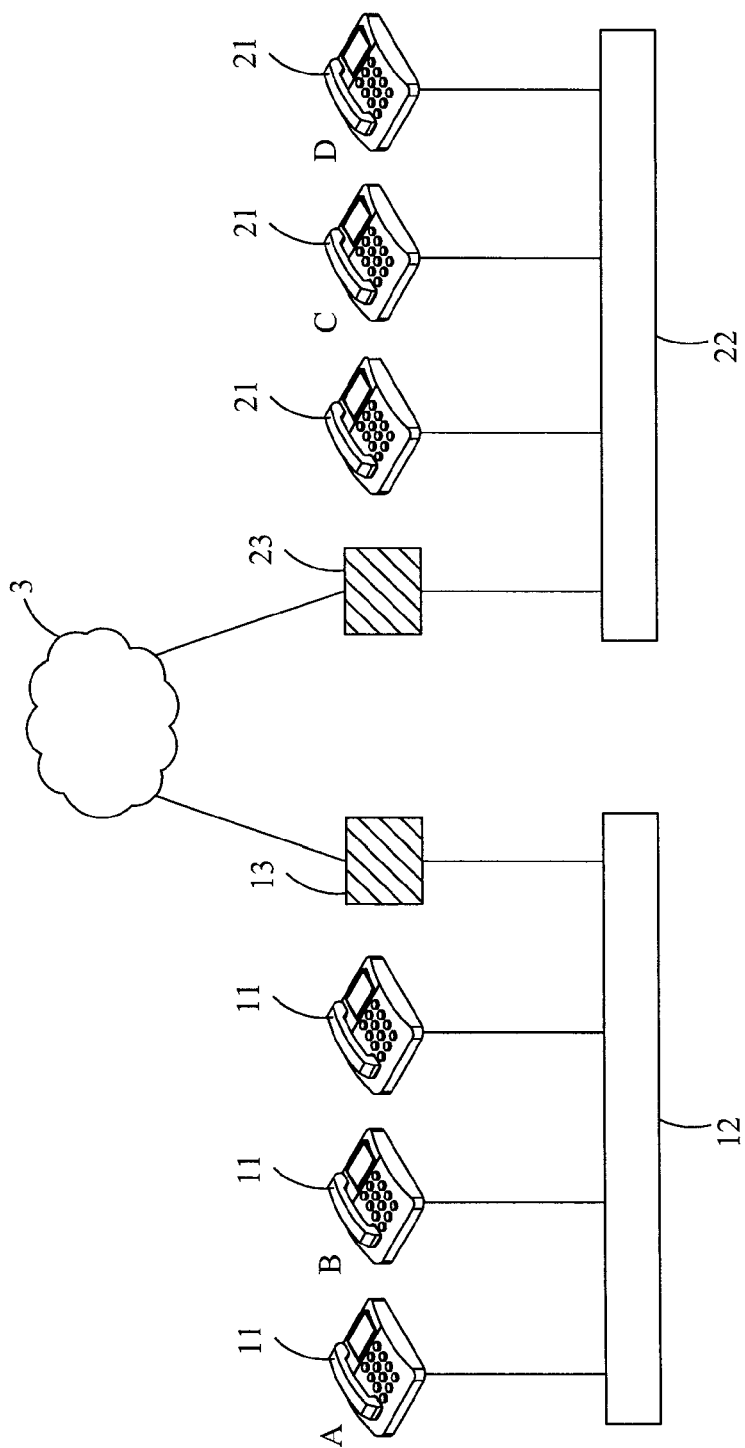
FIG. 2 is a first schematic view of a communication method and a communication system of a preferred embodiment of the present invention.
Figure 3:
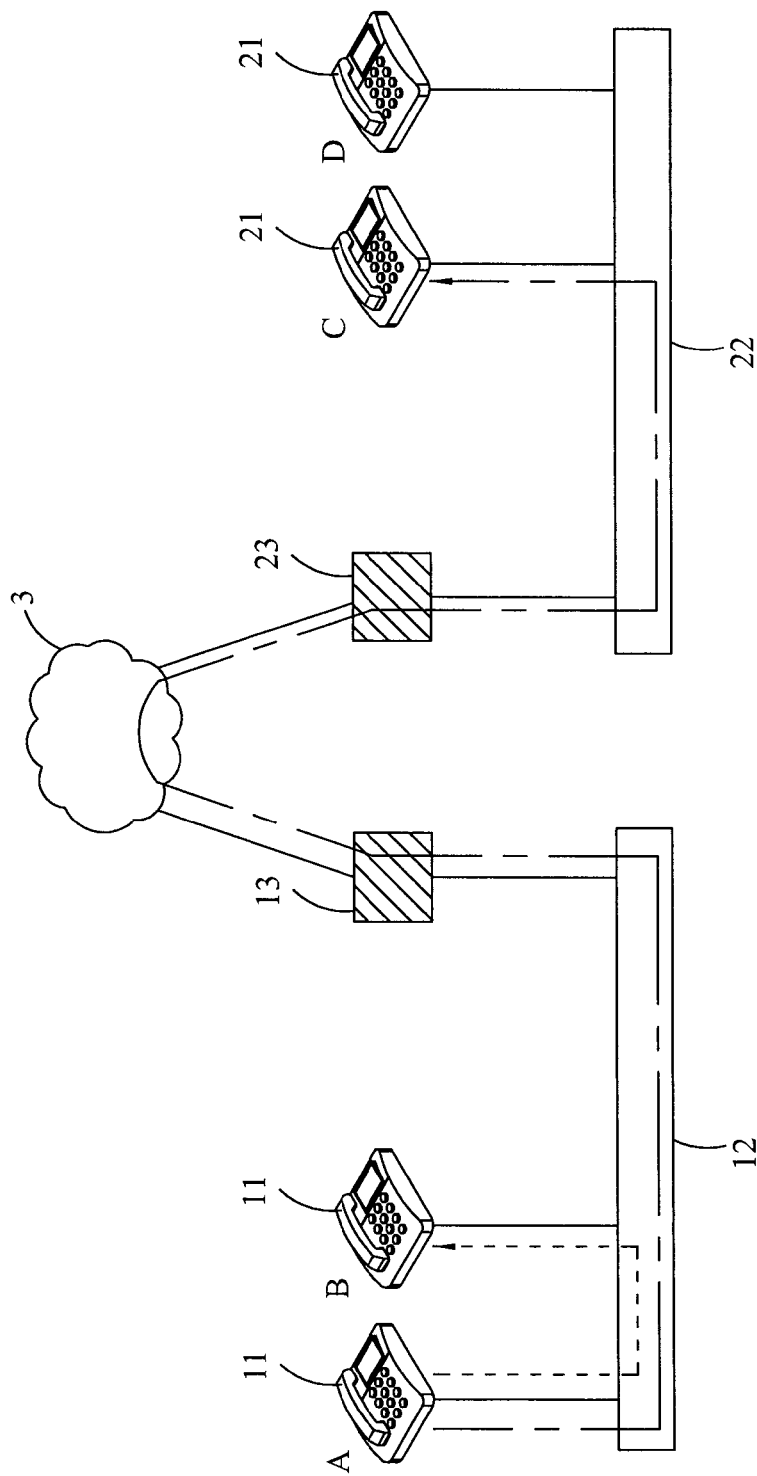
FIG. 3 is a second schematic view of a communication method and a communication system of a preferred embodiment of the present invention.

With reference to FIGS. 2 and 3 for the first and second schematic views of a communication method and a system thereof in accordance with a preferred embodiment of the present invention respectively, the communication system as shown in FIG. 2 comprises a plurality of first communication devices 11, a first exchange device 12, a first switch device 13, a cloud server 3, a plurality of second communication devices 21, a second exchange device 22 and a second switch device 23. Wherein, each of the first communication devices 11 has a first identification code, and each of the second communication devices 21 has a second identification code, and the first switch device 13 has a first registration code, and the second switch device 23 has a second registration code.

For the purpose of simplifying the illustration of the invention, the first communication device A is designed to have a first identification code a, the first communication device B is designed to have a first identification code b, the second communication device C is designed to have a second identification code c, the second communication device D is designed to have a second identification code d, the first switch device 13 is designed to have a first registration code f, and the second switch device 23 is designed to have a second registration code s.

In FIG. 3, when a user wants to use the first communication device A for a telephone call with the first communication device B, the first communication device A transmits a communication request signal and a first identification code b to the first exchange device 12 via telephone connection, and the first exchange device 12 identifies whether the first communication device B and the first communication device A are in the same communication domain according to the first identification code b. Now, the first exchange device 12 transmits the communication request signal to the first communication device B via telephone connection. After the first communication device B confirms the communication request signal, the first communication device A establishes a communication connection with the first communication device B via telephone connection by the first exchange device 12.

In a preferred embodiment, the information transmitted from the first communication device A to the first exchange device 12 further includes a first identification code a, so that the first exchange device 12 may transmit the first identification code a to the first communication device B, and the first communication device B may confirms that the request end of the communication connection is the first communication device A by the first identification code a.

When the user wants to use the first communication device A to have a telephone call with the second communication device C, the first communication device A transmits a communication request signal and a second identification code c to the first exchange device 12 via telephone connection, and the first exchange device 12 identifies whether the second communication device C and the first communication device A are in different communication domains according to the second identification code c. Now, the first exchange device 12 transmits the communication request signal and the second identification code c to the first switch device 13 via telephone connection, and then the first switch device 13 transmits the communication request signal and the second identification code c to the cloud server 3 via network connection.

It is noteworthy that the cloud server 3 has a database for recording a first registration code f corresponding to the first identification code a, b and a second registration code s corresponding to the second identification code c. For example, the cloud server records that the first identification code a and the first identification code b correspond to the first registration code f and the second identification code c corresponds to the second registration code s, so that the cloud server may determine whether the first communication device A with the first identification code a and the first communication device B with the first identification code b fall within the same communication domain of the first switch device 13 with the first registration code f, and also determines whether the second communication device C with the second identification code c fall within the same communication domain of the second switch device 23.

Therefore, the cloud server transmits the communication request signal and the second identification code c to the second switch device 23 according to the second identification code c via network connection, and the second switch device 23 transmits the communication request signal and the second identification code c to the second exchange device 22 via telephone connection, and the second exchange device 22 identifies whether a receiving end of the communication request signal is the second communication device C according to the second identification code c to transmit the communication request signal to the second communication device C via telephone connection. After the second communication device C confirms the communication request signal, the first communication device A establishes a communication connection with the second communication device C through the first exchange device 12, the first switch device 13, the cloud server 3, the second switch device 23 and the second exchange device 22.

It is noteworthy that the connection of the first communication device A to the first switch device 13 through the first exchange device 12 and the connection of the second switch device 23 to the second communication device C through the second exchange device 22 are both telephone connections, and the connection of the first switch device 13 to the second switch device 23 through the cloud server 3 is a network connection.

In a preferred embodiment, the information transmitted from the first communication device A to the first exchange device 12 similarly further includes a first identification code a, so that the first identification code a may be transmitted to the second communication device C through the first exchange device 12, the first switch device 13, the cloud server 3, the second switch device 23 and the second exchange device 22, and the second communication device C may confirm whether the request end of the communication connection is the first communication device A by the first identification code a.

In addition, when the second switch device 23 transmits the communication request signal to the second communication device C through the second exchange device 22, and the second communication device C has not received the communication request signal within a predetermined time, the second switch device 23 assumes but not limited to the second identification code d according to a switch code of the second communication device C, and then transmits the communication request signal to the second communication device D through the second exchange device 22 again. When the second communication device D receives the request signal, the first communication device A establishes a communication connection with the second communication device D through the first exchange device 12, the first switch device 13, the cloud server 3, the second switch device 23 and the second exchange device 22.

Figure 4:
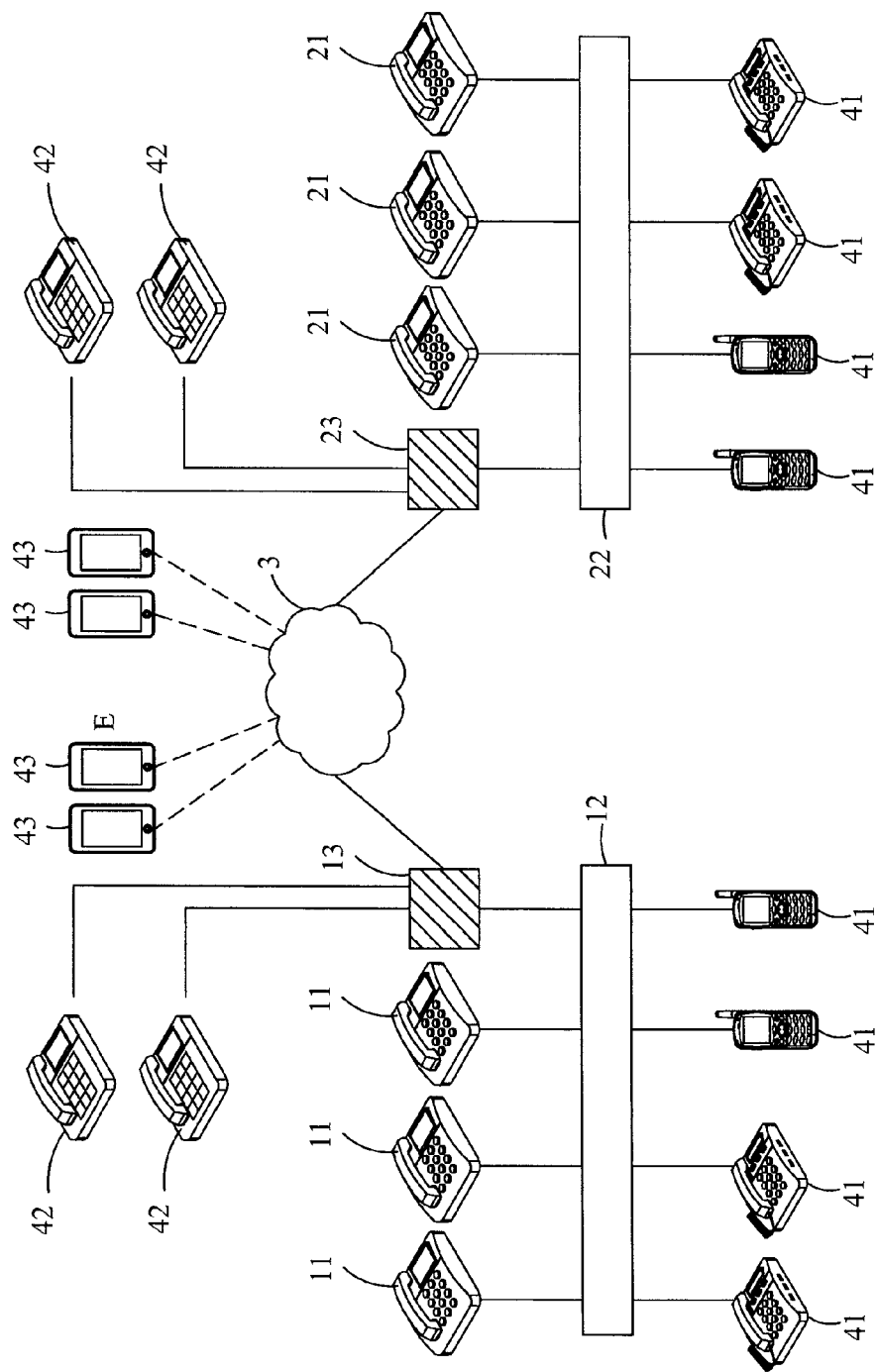
FIG. 4 is a third schematic view of a communication method and a communication system of a preferred embodiment of the present invention.

With reference to FIG. 4 for the third schematic view of a communication method and a system thereof in accordance with a preferred embodiment of the present invention, the office extension system should not be limited to be installed to the extensions in an office if the concept of modern mobile office is taken into consideration, so that of the first exchange device 12 and the second exchange device 22 of the communication system may be connected to a plurality of third communication devices 41 via telephone connection, and the first switch device 13 and the second switch device 23 may be connected to a plurality of fourth communication devices 42 via network connection to achieve the purpose of expanding the extensions. In addition, the network communication device 43 may be connected to the first switch device 13 or the second switch device 23 through the cloud server via network connection, so as to establish a communication connection with the first communication device 11, the second communication device 21, the third communication device 41 or the fourth communication device 42. Wherein, the network communication device 43 may be a Smartphone, and the third communication device 41 may be a mobile phone or a conventional home phone, and the fourth communication device 42 may be an IP phone on the desktop computer, but the invention is not limited to the aforementioned devices only.

It is noteworthy that the network communication device 43 may be used as a dial machine, and after a communication signal is sent to a communication target, a specified extension establishes a communication connection with the communication target.

For the purpose of simplifying the illustration of the invention, the first communication device A is designed to have a first identification code a, the second communication device C is designed to have a second identification code c, the first switch device 13 is designed to have a first registration code f, and the second switch device 23 is designed to have a second registration code s.

When a user wants to use the first communication device A to establish a communication connection between network communication device E and the second communication device C, the network communication device E transmits the first identification code a, the communication request signal and the second identification code c to the cloud server 3, and the cloud server 3 transmits the communication request signal and the first identification code a to the first switch device 13 via network connection according to the first identification code a and the first identification code c, and transmits the communication request signal and the second identification code c to the second switch device 23 via network connection. The first switch device 13 transmits the communication request signal and the first identification code a to the first exchange device 12 via telephone connection, and transmits the communication request signal to the first communication device A according to the first identification code a. The second switch device 23 transmits the communication request signal and the second identification code c to the second exchange device 22 via telephone connection and transmits the communication request signal to the first communication device C according to the second identification code c. After both of the first communication device A and the second communication device C have received the communication request signal, the first communication device A establishes a communication connection with the second communication device C through the first exchange device 12, the first switch device 13, the cloud server 3, the second switch device 23 and the second exchange device 22.

The method of establishing a communication connection via a third communication device 41, a fourth communication device 42 or a network communication device 43 is similar to the foregoing preferred embodiment, and thus will not be repeated.

While the invention has been described by means of specific embodiments, numerous modifications and variations could be made thereto by those skilled in the art without departing from the scope and spirit of the invention set forth in the claims.

What is claimed is:

1. A communication method, comprising:
   sending a communication request signal and a second identification code corresponding to a second communication device by a first communication device;
   receiving the communication request signal and the second identification code and sending the communication request signal and the second identification code to a first switch device by a first exchange device;
   receiving the communication request signal and the second identification code, and sending the communication request signal and the second identification code to a cloud server via network transmission by the first switch device;
   sending the communication request signal and the second identification code to a second switch device according to the communication request signal and the second identification code by the cloud server;
   receiving the communication request signal and the second identification code, and then sending the communication request signal and the second identification code to a second exchange device by the second switch device;
   sending the communication request signal to the second communication device according to the communication request signal and the second identification code by the second exchange device; and
   receiving the communication request signal by the second communication device, and then establishing a network communication connection with the first communication device through the first switch device, the cloud server and the second switch device.

2. The communication method of claim 1, further comprising steps of:
   determining whether the second communication device falls within the same communication domain of the first exchange device according to the second identification code by the first exchange device;
   if so, then transmitting the communication request signal to the second communication device, and receiving the communication request signal by the second communication device, and then establishing a telephone communication connection with the first communication device through the first exchange device;
   or else, transmitting the communication request signal and the second identification code to the first switch device.

3. The communication method of claim 1, wherein the first switch device has a first registration code, and the second switch device has a second registration code, and the communication method further comprises a step of:
   recording the first registration code corresponding to a first identification code of the first communication device and the second registration code corresponding to the second identification code by the cloud server to determine establishing a network connection with the first switch device or the second switch device.

4. The communication method of claim 3, further comprising steps of:
receiving the second identification code and then comparing the second identification code with the recorded second registration code corresponding to the second identification code by the cloud server; and
transmitting the communication request signal and the second identification code to the second switch device according to the second registration code by the cloud server.

5. The communication method of claim 1, further comprising a step of:
connecting the first exchange device and the second exchange device with at least one third communication device via telephone connection.

6. The communication method of claim 1, further comprising a step of:
connecting the first switch device and the second switch device with at least one fourth communication device via network connection.

7. The communication method of claim 1, further comprising steps of:
sending the first identification code, the communication request signal and the second identification code to the cloud serve by a network communication device;
receiving the first identification code, the communication request signal and the second identification code and sending the communication request signal and the first identification code to the first switch device according to the first identification code and the second identification code, and sending the communication request signal and the second identification code to the second switch device by the cloud server;
receiving the communication request signal and the first identification code, and then sending the communication request signal and the first identification code to the first exchange device by the first switch device, and receiving the communication request signal and the second identification code and then sending the communication request signal and the second identification code to the second exchange device by the second switch device;
sending the communication request signal to the first communication device according to the communication request signal and the first identification code by the first exchange device, and sending the communication request signal to the second communication device according to the communication request signal and the second identification code by the second exchange device; and
receiving the communication request signal by the first communication device and the second communication device, and then establishing a network communication connection through the first switch device, the cloud server and the second switch device.

8. The communication method of claim 1, wherein the second switch device records a switch code corresponding to the second communication device, and the communication method further comprises a step of:
when the second communication device has not received the communication request signal after a predetermined time, transferring the communication request signal to a communication device corresponding to the switch code according to the switch code by the second switch device.

9. A communication system, comprising:
a first communication device, sending a communication request signal and a second identification code corresponding to a second communication device;
a first exchange device, receiving the communication request signal and the second identification code and sending the communication request signal and the second identification code to a first switch device;
the first switch device, receiving the communication request signal and the second identification code, and sending the communication request signal and the second identification code to a cloud server via network transmission;
the cloud server, sending the communication request signal and the second identification code to a second switch device according to the communication request signal and the second identification code;
the second switch device, receiving the communication request signal and the second identification code, and transmitting the communication request signal and the second identification code to a second exchange device;
the second exchange device, sending the communication request signal to the second communication device according to the communication request signal and the second identification code; and
the second communication device, receiving the communication request signal, and establishing a network communication connection with the first communication device through the first switch device, the cloud server and the second switch device.

10. The communication system of claim 9, wherein:
the first exchange device determines whether the second communication device falls within the same communication domain of the first exchange device according to the second identification code;
if so, the first exchange device transmits the communication request signal to the second communication device, and the second communication device receives the communication request signal and establishes a telephone communication connection with the first communication device through the first exchange device;
or else, the first exchange device transmits the communication request signal and the second identification code to the first switch device.

11. The communication system of claim 9, wherein the first switch device has a first registration code, and the second switch device has a second registration code, and the cloud server records the first registration code corresponding to a first identification code of the first communication device and the second registration code corresponding to the second identification code to determine establishing a network connection with the first switch device or the second switch device.

12. The communication system of claim 11, wherein:
the cloud server receives the second identification code and compares the second identification code with the recorded second registration code corresponding to the second identification code; and
the cloud server transmits the communication request signal and the second identification code to the second switch device according to the second registration code.

13. The communication system of claim 9, wherein the first exchange device and the second exchange device are connected to at least one third communication device via telephone connection.

14. The communication system of claim 9, wherein the first switch device and the second switch device are connected to at least one fourth communication device via network connection.

15. The communication system of claim 9, further comprising:
   a network communication device sending the first identification code, the communication request signal and the second identification code to the cloud server, wherein:
   the cloud server receives the first identification code, the communication request signal and the second identification code and sends the communication request signal and the first identification code to the first switch device according to the first identification code and the second identification code, and sends the communication request signal and the second identification code to the second switch device;
   the first switch device receives the communication request signal and the first identification code, and sends the communication request signal and the first identification code to the first exchange device, and the second switch device receives the communication request signal and the second identification code and sends the communication request signal and the second identification code to the second exchange device;
   the first exchange device sends the communication request signal to the first communication device according to the communication request signal and the first identification code, and the second exchange device sends the communication request signal to the second communication device according to the communication request signal and the second identification code; and
   the first communication device and the second communication device receive the communication request signal, and establish a network communication connection through the first switch device, the cloud server and the second switch device.

16. The communication system of claim 9, wherein the second switch device records a switch code corresponding to the second communication device, and if the second communication device has not received the communication request signal after a predetermined time, the second switch device transfers the communication request signal to a communication device corresponding to the switch code according to the switch code.

* * * * *